(12) United States Patent
Makino et al.

(10) Patent No.: US 11,750,072 B2
(45) Date of Patent: Sep. 5, 2023

(54) MOTOR UNIT

(71) Applicant: Nidec Corporation, Kyoto (JP)

(72) Inventors: Takayuki Makino, Kyoto (JP);
Tatsuhiko Mizutani, Kyoto (JP);
Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 52 days.

(21) Appl. No.: 17/481,364

(22) Filed: Sep. 22, 2021

(65) Prior Publication Data

US 2022/0094250 A1 Mar. 24, 2022

(30) Foreign Application Priority Data

Sep. 24, 2020 (JP) ................................ 2020-160123

(51) Int. Cl.
| | | |
|---|---|---|
| H02K 9/19 | (2006.01) | |
| H02K 24/00 | (2006.01) | |
| H02K 5/173 | (2006.01) | |
| H02K 5/20 | (2006.01) | |
| H02K 7/08 | (2006.01) | |
| H02K 11/225 | (2016.01) | |
| H02K 7/116 | (2006.01) | |
| B60K 1/00 | (2006.01) | |

(52) U.S. Cl.
CPC ........... *H02K 24/00* (2013.01); *H02K 5/1732* (2013.01); *H02K 5/203* (2021.01); *H02K 7/083* (2013.01); *H02K 7/116* (2013.01); *H02K 9/19* (2013.01); *H02K 11/225* (2016.01); *B60K 1/00* (2013.01); *B60K 2001/006* (2013.01)

(58) Field of Classification Search
CPC ................................. H02K 9/19; H02K 24/00
See application file for complete search history.

(56) References Cited

U.S. PATENT DOCUMENTS

| | | | | |
|---|---|---|---|---|
| 3,679,277 A | * | 7/1972 | Dohmen | .................. F16C 33/76 |
| | | | | 310/90 |
| 6,727,609 B2 | * | 4/2004 | Johnsen | .................... H02K 1/32 |
| | | | | 310/58 |
| 10,158,274 B2 | * | 12/2018 | Sakai | ..................... H02K 11/40 |

FOREIGN PATENT DOCUMENTS

JP 2016-119760 A 6/2016

* cited by examiner

*Primary Examiner* — Dang D Le
(74) *Attorney, Agent, or Firm* — KEATING & BENNETT

(57) ABSTRACT

A motor assembly includes a motor including a rotor including a shaft rotatable about a rotation axis and a stator surrounding the rotor from radially outside, a housing that accommodates the motor, a bearing that is fixed to the housing and rotatably supports the shaft, a resolver including a resolver rotor fixed to the shaft and a resolver stator fixed to the housing, and a contact that has conductivity, is fixed to the housing, and is in contact with a contacted portion at an end portion on one axial side of the shaft. The housing includes an accommodation space in which the contacted portion of the shaft is accommodated. The contact and the resolver are side by side in a direction along a rotation axis in the accommodation space.

20 Claims, 12 Drawing Sheets

MOTOR UNIT

CROSS-REFERENCE TO RELATED APPLICATIONS

The present application claims priority under 35 U.S.C. § 119 to Japanese Patent Application No. 2020-160123, filed on Sep. 24, 2020, the entire contents of which are hereby incorporated herein by reference.

FIELD OF THE INVENTION

The present disclosure relates to a motor assembly.

BACKGROUND

Conventionally, a motor having a brush electrically connected to a housing at an end portion of a rotor shaft has been known.

However, in the motor having the brush described above, the contact area between the brush and the rotor shaft is small, and the electric resistance between the brush and the rotor shaft increases. As a result, a current hardly flows between the rotor shaft and the housing, and a potential difference may be generated.

SUMMARY

A motor assembly according to an example embodiment of the present disclosure includes a motor including a rotor including a shaft rotatable about a rotation axis and a stator surrounding the rotor from radially outside, a housing that accommodates the motor, a bearing that is fixed to the housing and rotatably supports the shaft, a resolver including a resolver rotor fixed to the shaft and a resolver stator fixed to the housing, and a contact that has conductivity, is fixed to the housing, and is in contact with a contacted portion at an end portion on one axial side of the shaft. The housing includes an accommodation space in which the contacted portion of the shaft is accommodated. The contact and the resolver are side by side in a direction along a rotation axis in the accommodation space.

The above and other elements, features, steps, characteristics and advantages of the present disclosure will become more apparent from the following detailed description of the example embodiments with reference to the attached drawings.

DETAILED DESCRIPTION

Hereinafter, motor assemblies according to example embodiments of the present disclosure will be described with reference to the drawings. Note that the scope of the present disclosure is not limited to the example embodiments described below, but includes any modifications thereof within the scope of the technical idea of the present disclosure.

Figure 1:
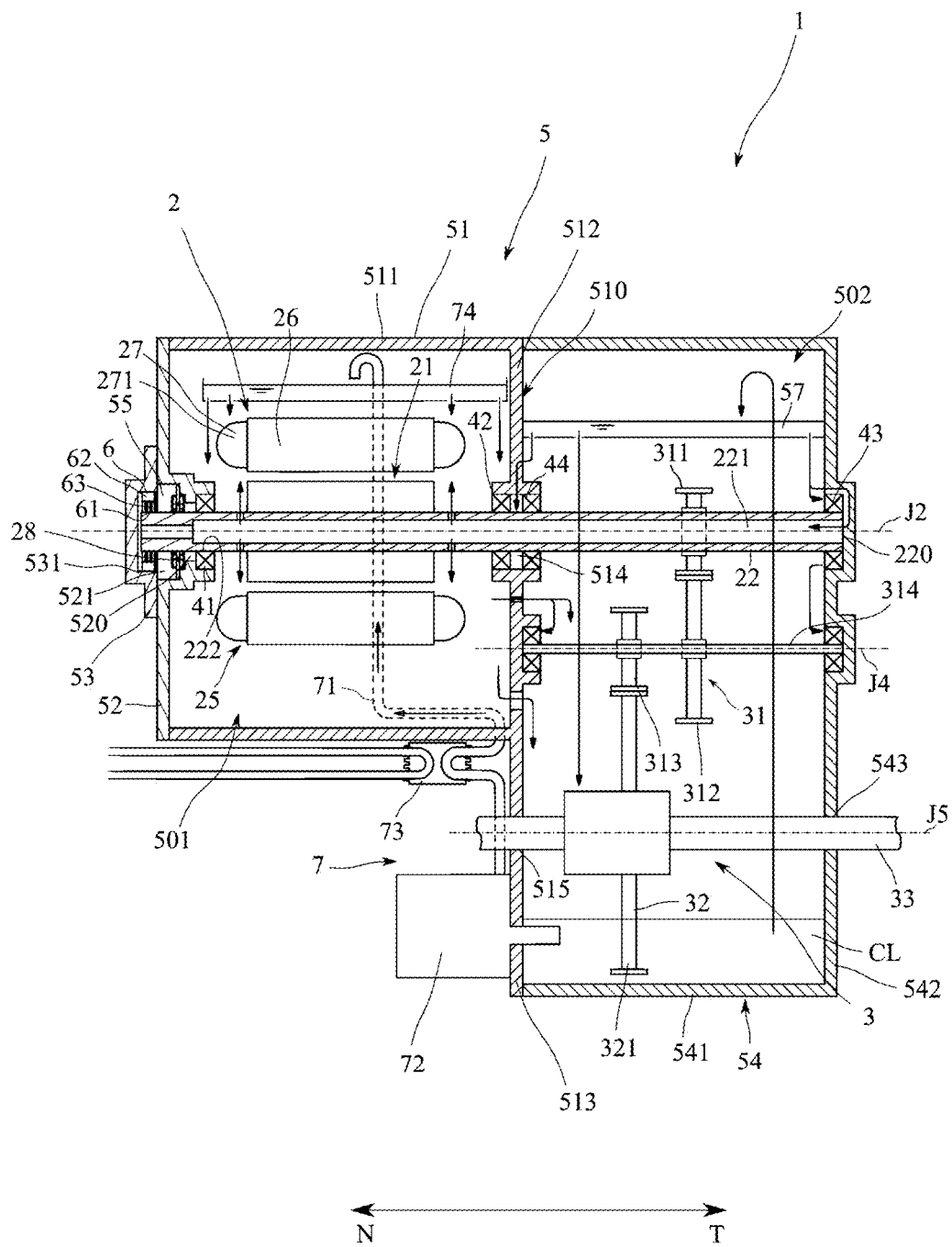
FIG. 1 is a conceptual diagram of a motor assembly of an example embodiment of the present disclosure.

In the present specification, a direction parallel to a rotation axis J2 of a rotor 21 of a motor 2 is referred to as an "axial direction" of a motor assembly 1. The one axial side N and the other axial side T are defined as illustrated in FIG. 1. Additionally, the radial direction orthogonal to the rotation axis J2 is simply referred to as "radial direction", and the circumferential direction around the rotation axis J2 is simply referred to as "circumferential direction". Moreover, the "parallel direction" in the present specification includes not only the case where the directions are completely parallel, but also a substantially parallel direction. Then, "extending along" a predetermined direction or a plane includes not only a case of extending strictly in a predetermined direction but also a case of extending in a direction inclined within a range of less than 45° with respect to the exact direction.

Figure 2:
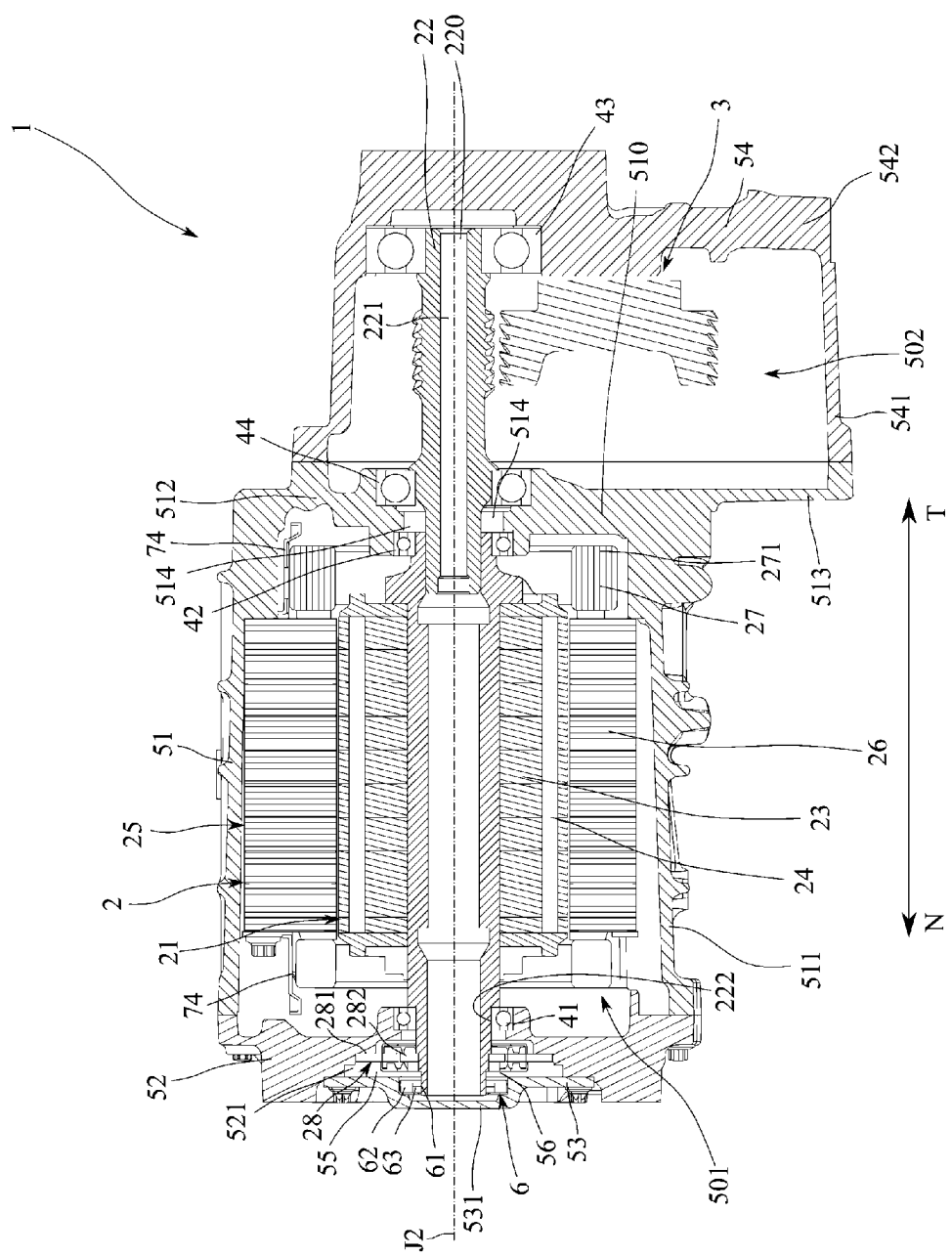
FIG. 2 is a cross-sectional view taken along a plane including a rotation axis of the motor assembly.
Figure 3:
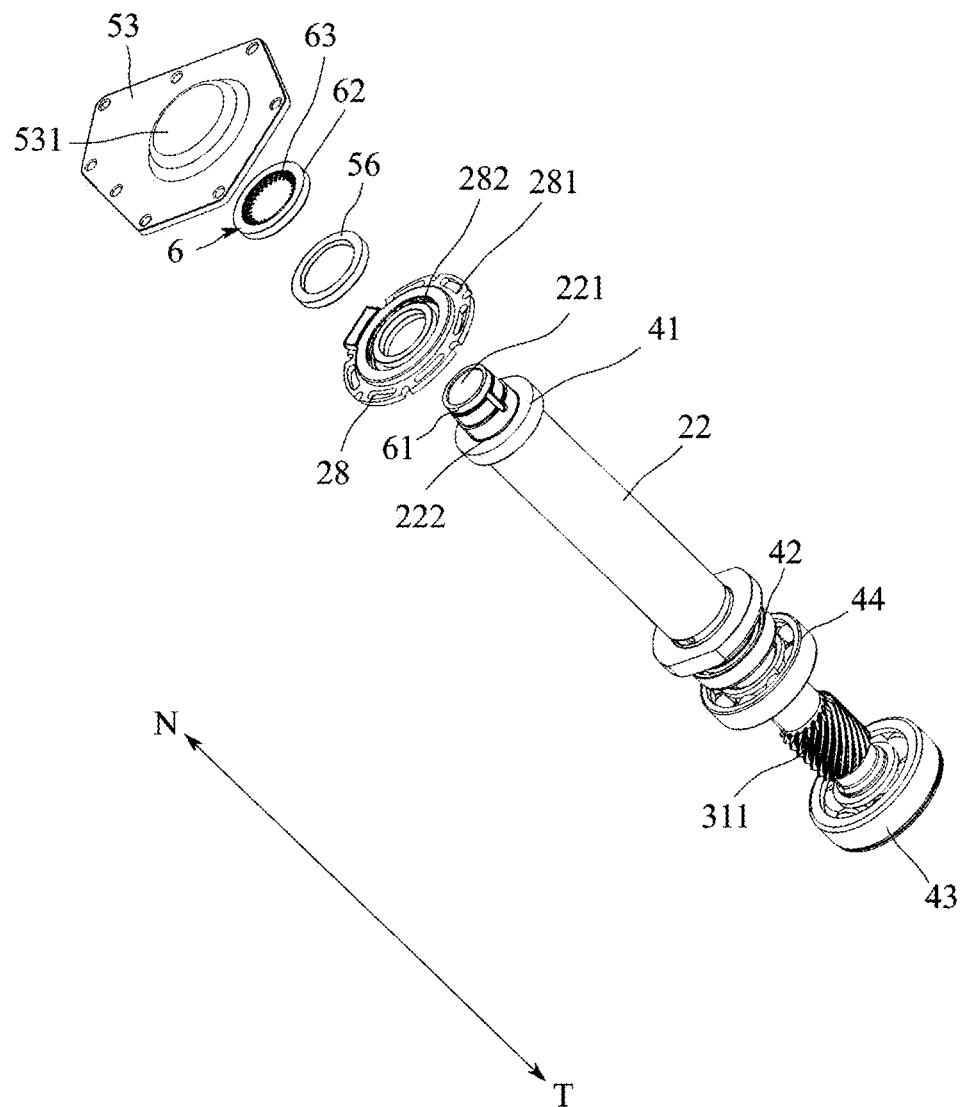
FIG. 3 is an exploded perspective view of a shaft of an example embodiment of the present disclosure.

Hereinafter, the motor assembly 1 of an example embodiment of the present disclosure will be described with reference to the drawings. FIG. 1 is a conceptual diagram of the motor assembly 1 of an example embodiment. FIG. 2 is a cross-sectional view taken along a plane including the rotation axis J2 of the motor assembly 1. FIG. 3 is an exploded perspective view of a shaft 22. Note that FIG. 1 is only a conceptual diagram, and the layout and dimension of each part are not necessarily identical to those of the actual motor assembly 1.

The motor assembly 1 is mounted on a vehicle, such as a hybrid vehicle (HV), a plug-in hybrid vehicle (PHV), and an electric vehicle (EV), in which at least a motor is used as a power source. The motor assembly 1 is used as the power source of the vehicle.

As illustrated in FIG. 1, the motor assembly 1 has the motor 2, a housing 5, and a contact 6. The housing 5 accommodates the motor 2. Additionally, the motor assembly 1 further has a gear portion 3 connected to the other axial side T of the shaft 22 and accommodated in the housing 5.

The motor 2 is a brushless DC motor. The motor 2 is driven by electric power from an inverter (not shown). The motor has the rotor 21 that rotates about the rotation axis J2 extending in the horizontal direction, and a stator 25 located radially outward of the rotor 21. The motor 2 is an inner rotor type motor in which the rotor 21 is rotatably disposed inward of the stator 25. That is, the motor 2 has the rotor 21 having the shaft 22 rotatable about the rotation axis J2, and the stator 25 surrounding the rotor 21 from the radially outer side.

The rotor 21 rotates when electric power is supplied to the stator 25. As illustrated in FIG. 2, the rotor 21 has the shaft 22, a rotor core 23, and a rotor magnet 24. The rotor 21 rotates about the rotation axis J2 extending in the horizontal direction.

The shaft 22 extends about the rotation axis J2 extending horizontally and in the vehicle width direction. The shaft 22 rotates about the rotation axis J2. In the motor assembly 1 of the present example embodiment, a lubricating oil CL as a coolant to be described later flows through a hollow portion 221 of the shaft 22. For this reason, the shaft 22 has therein the hollow portion 221 penetrating along the rotation axis J2, and has an inlet 220 through which the lubricating oil CL flows into the hollow portion 221 on the other axial side T. That is, the shaft 22 has a tubular shape penetrating in the axial direction, and has the inlet 220 that allows entry of the lubricating oil CL at an end portion on the other axial side T. As a result, it is possible to avoid blockage of the hollow portion 221 of the shaft 22. Additionally, since the shaft 22 has the hollow portion 221, a conductive wire can be arranged in the hollow portion 221 of the shaft 22, for example. Moreover, the weight of the shaft 22 can be reduced.

The shaft 22 is rotatably supported by the housing 5 through a first bearing 41, a second bearing 42, a third bearing 43, and a fourth bearing 44 to be described later. That is, the bearings 41, 42, 43, and 44 are fixed to the housing 5 to support the shaft 22 in a rotatable manner.

Note that the shaft 22 can be divided into a portion in a motor accommodation space 501 and a portion in a gear accommodation space 502. When the shaft 22 is dividable, the divided shafts 22 can adopt a screw coupling using a male screw and a female screw, for example. Alternatively, the divided shafts 22 may be joined by a fixing method such as welding. When a fixing method such as press-fitting or welding is adopted, serrations combining axially extending recesses and protrusions may be employed. With such a configuration, it is possible to reliably transmit the rotation. Additionally, the shaft 22 may be formed as a single member.

The rotor core 23 is formed by laminating thin electromagnetic steel plates. The rotor core 23 is a columnar body extending along the axial direction. A plurality of rotor magnets 24 are fixed to the rotor core 23. The plurality of rotor magnets 24 are arranged along the circumferential direction with magnetic poles disposed alternately.

As illustrated in FIG. 2, the stator 25 has a stator core 26, coils 27, and an insulator (not shown) arranged between the stator core 26 and the coils 27. The stator 25 is held by the housing 5. The stator core 26 has a plurality of magnetic pole teeth (not shown) extending radially inward from an inner peripheral surface of an annular yoke.

The coil 27 is formed by winding an electric wire around the magnetic pole teeth. The coil 27 is connected to an inverter unit (not shown) through a bus bar (not shown). The coil 27 has a coil end 271 protruding from an axial end face of the stator core 26. The coil end 271 protrudes axially beyond an end portion of the rotor core 23 of the rotor 21.

A resolver 28 (See FIGS. 2, 3, and the like) is attached to an end portion on the one axial side N of the shaft 22. The resolver 28 detects the position of the rotor 21, that is, the rotation angle. As illustrated in FIGS. 2 and 3, the resolver 28 has a resolver stator 281 and a resolver rotor 282. The resolver stator 281 is fixed to a later-described bearing holder 52 of the housing 5. The resolver rotor 282 is fixed to the shaft 22. That is, the resolver 28 has the resolver rotor 282 fixed to shaft 22 and the resolver stator 281 fixed to housing 5.

The resolver stator 281 has an annular shape, and the resolver rotor 282 has a disk shape. An inner peripheral surface of the resolver stator 281 and an outer peripheral surface of the resolver rotor 282 face each other in the radial direction. The resolver stator 281 periodically detects the position of the resolver rotor 282 when the rotor 21 rotates. As a result, the resolver 28 acquires information on the position of the rotor 21 from the information on the position of the resolver rotor 282.

Additionally, a bus bar (not shown) is disposed at an end portion on the one axial side N inside the housing 5. The bus bar connects an inverter unit (not shown) and the coil 27 and supplies electric power to the coil 27. Electric power is supplied to the coil 27 from the one axial side N.

The gear portion 3 has a plurality of gears and is accommodated in the housing 5. As described above, the gear portion 3 is connected to the shaft 22 on the other axial side T. The gear portion 3 has a speed reduction portion 31 and a differential portion 32.

As illustrated in FIG. 1, the speed reduction portion 31 is connected to the shaft 22. The speed reduction portion 31 transmits the torque output from the motor 2 to the differential portion 32. The speed reduction portion 31 reduces the rotational speed of the motor 2 according to the reduction ratio and increases the torque output from the motor 2 according to the reduction ratio.

The speed reduction portion 31 is a speed reducer of a parallel-axis gearing type, in which center axes of gears are arranged in parallel with each other. The speed reduction portion 31 has a first gear 311 which is an intermediate drive gear, a second gear 312 which is an intermediate gear, a third gear 313 which is a final drive gear, and an intermediate shaft 314.

The first gear 311 is disposed on an outer peripheral surface of the shaft 22. In the motor assembly 1 of the present example embodiment, the first gear 311 and the shaft 22 are formed of a single member. The first gear 311 rotates about the rotation axis J2 together with the shaft 22. The intermediate shaft 314 extends along an intermediate axis J4 parallel to the rotation axis J2. Both end portions in the axial direction of the intermediate shaft 314 are rotatably supported by the housing 5 through bearings. That is, the intermediate shaft 314 is rotatable about the intermediate axis J4.

The second gear 312 and the third gear 313 are disposed on the intermediate shaft 314. The second gear 312 meshes with the first gear 311. The third gear 313 meshes with a ring gear 321 of the differential portion 32. The torque of the shaft 22 is transmitted from the first gear 311 to the second gear 312. Then, the torque transmitted to the second gear 312 is transmitted to the third gear 313 through the intermediate shaft 314. The torque transmitted to the third gear 313 is transmitted to the ring gear 321 of the differential portion 32. In this manner, the speed reduction portion 31 transmits the torque output from the motor 2 to the differential portion 32. The number of gears, the gear ratios of the gears, and so on can be modified in various manners according to the desired reduction ratio.

The differential portion 32 transmits the torque output from the motor 2 to an output shaft 33. The output shaft 33 is attached to each of the left and right sides of the differential portion 32. For example, the differential portion 32 has a function of transmitting the same torque to the left and right output shafts 33 while absorbing the speed difference between the left and right drive wheels, that is, the output shafts 33 when the vehicle turns. The output shaft 33 protrudes to the outside of the housing 5. A drive shaft (not shown) connected to a drive wheel of the vehicle is connected to the output shaft 33.

In addition to these, the gear portion 3 may have a parking mechanism (not shown) that locks the vehicle when the operation of the motor assembly 1 is stopped.

As illustrated in FIGS. 1, 2, and the like, the housing 5 has a housing main body 51, the bearing holder 52, a cover 53, and a gear accommodation portion 54. The housing main body 51, the bearing holder 52, and the gear accommodation portion 54 are formed of, for example, a conductive material such as iron, aluminum, or an alloy thereof, in other words, metal, but are not limited thereto. Note that the housing main body 51, the bearing holder 52, the cover 53, and the gear accommodation portion 54 may be formed of the same material or may be formed of different materials. In order to suppress contact corrosion of dissimilar metals at the contact portion, it is preferable to form the parts with the same material.

The housing main body 51 has a first tube portion 511, a partition wall portion 512, and a protrusion 513. The first tube portion 511 is a tubular body extending in the axial direction. The stator core 26 is fixed inside the housing main body 51. That is, the housing 5 has the housing main body 51 that holds the stator 25. The first tube portion 511 has an opening on the one axial side N.

The partition wall portion 512 expands radially inward from an end portion on the other axial side T of the first tube portion 511. The partition wall portion 512 is provided with a through hole 514 penetrating along the rotation axis J2. The through hole 514 has a circular cross section, and its center line overlaps with the rotation axis J2. Then, the shaft 22 penetrates the through hole 514. The shaft 22 penetrating the through hole 514 is rotatably supported by the partition wall portion 512 through the second bearing 42 and the fourth bearing 44. The second bearing 42 is disposed on the one axial side N of the partition wall portion 512, and the fourth bearing 44 is disposed on the other axial side T of the partition wall portion 512. As a result, since the shaft 22 is rotatably supported at an intermediate portion in the axial direction, deflection, warpage, and the like of the shaft 22 are curbed when the shaft 22 rotates.

The protrusion 513 has a flat plate shape and extends vertically downward from the other axial side T of an outer peripheral surface of the first tube portion 511. In the motor assembly 1 according to the present example embodiment, the first tube portion 511, the partition wall portion 512, and the protrusion 513 are formed of a single member. The partition wall portion 512 and the protrusion 513 form a side plate 510 that closes an end portion on the one axial side N of the gear accommodation portion 54.

A first drive shaft passage hole 515 is formed in the protrusion 513. The first drive shaft passage hole 515 is a hole axially penetrating the protrusion 513. The output shaft 33 penetrates the first drive shaft passage hole 515 in a rotatable state. An oil seal (not shown) is provided between the output shaft 33 and the first drive shaft passage hole 515 to curb leakage of the lubricating oil CL. An axle (not shown) for rotating the wheel is connected to the tip end of the output shaft 33.

The bearing holder 52 expands in the radial direction. The bearing holder 52 is fixed to the one axial side N of the first tube portion 511. While the bearing holder 52 can be fixed to the first tube portion 511 with a screw, for example, the method is not limited thereto, and a method of firmly fixing the bearing holder 52 to the first tube portion 511, such as screwing or press-fitting, can be widely adopted.

As a result, the bearing holder 52 is electrically connected to the housing main body 51. Here, the term "two members are electrically connected" includes a case where the two members are physically in contact with each other and can be electrically conducted, and also includes a case where the two members are close to each other to an extent of being substantially at the same potential. That is, electrically connected members have the same or substantially same potential. Hereinafter, in a case where there is electrical connection, a similar configuration is assumed. In the motor assembly 1 of the present example embodiment, the housing main body 51 and the bearing holder 52 have the same potential.

Additionally, the first tube portion 511 and the bearing holder 52 are in close contact with each other. Here, close contact means to have such a sealing property that the lubricating oil CL inside the housing 5 does not leak to the outside and that foreign matters such as external water, dust, and the like do not enter. Close contact refers to a similar configuration hereinafter.

The bearing holder 52 has a recess 521 recessed from a surface on the one axial side N of the bearing holder 52 to the other axial side. A through hole 520 penetrating in the axial direction is formed in a bottom surface of the recess 521. The center of the through hole 520 coincides with the rotation axis J2, and the shaft 22 penetrates the through hole 520. The end portion on the one axial side N of the shaft 22 is disposed inside the recess 521.

The first bearing 41 is disposed on the other axial side T of the bearing holder 52. The shaft 22 penetrating the through hole 520 is rotatably supported by the bearing holder 52 through the first bearing 41. That is, the housing 5 has the bearing holder 52 that is provided on the one axial side N of the housing main body 51 and holds the bearing 41 on the other axial side T thereof.

The resolver stator 281 of the resolver 28 is fixed to the inside of the recess 521. That is, the resolver stator 281 is fixed to the bearing holder 52. When the resolver stator 281 is disposed in the bearing holder 52, the center line thereof coincides with the rotation axis J2. Then, the resolver stator 281 is fixed to the bearing holder 52 by a screw (not shown). Note that the fixing of the resolver stator 281 to the bearing holder 52 is not limited to a screw, and a fixing method, such as press-fitting and bonding, which can firmly fix the resolver stator 281 to the bearing holder 52 can be widely adopted.

In the motor assembly 1, a part of the shaft 22 on the other axial side T of the rotor core 23 penetrates the through hole 514, and a part of the shaft 22 on the one axial side N of the rotor core 23 penetrates the through hole 520. Then, both sides of the shaft 22 across the rotor core 23 in the axial direction are rotatably supported by the housing 5 through the first bearing 41 and the second bearing 42. At this time, the shaft 22 is rotatable about the rotation axis J2.

The cover 53 is attached to the one axial side N of the bearing holder 52. The cover 53 covers the one axial side N of the recess 521 of the bearing holder 52, and is in close contact with the bearing holder 52. Additionally, the bearing holder 52 and the cover 53 are electrically connected. For this reason, the cover 53 and the housing main body 51 have the same potential. Then, the cover 53 has a contact fixing recess 531. The contact fixing recess 531 is recessed from a surface on the other axial side T of the cover 53, and a contact ring 62 of the contact 6 described later is fixed to the contact fixing recess 531. That is, the housing 5 has the cover 53 attached to the one axial side N of the bearing holder 52 and to which the contact 6 is fixed.

A region that is enclosed by covering the recess 521 of the bearing holder 52 with the cover 53 and fixing the cover 53 to the bearing holder 52 is an accommodation space 55. In a state where the stator 25 of the motor 2 is accommodated in the first tube portion 511, the bearing holder 52 is attached to the one axial side N of the first tube portion 511, and the cover 53 is attached to the one axial side N of the bearing holder 52. As a result, the end portion on the one axial side N of the shaft 22 is accommodated in the accommodation space 55. Then, a contacted portion 61 is formed at the end portion on the one axial side N of the shaft 22. That is, the housing 5 has the accommodation space in which the contacted portion 61 of the shaft 22 is accommodated. Further, the accommodation space 55 is formed between the cover 53 and the bearing holder 52.

As illustrated in FIGS. 1 and 2, the contact 6 and the resolver 28 are disposed side by side along the rotation axis J2 in the accommodation space 55. That is, the contact 6 and the resolver 28 are disposed side by side in the direction along the rotation axis J2 in the accommodation space 55. At this time, the contact 6 and the contacted portion 61 provided at the end portion on the one axial side N of the shaft 22 face each other in the radial direction. Details of the contact ring 62 and the contacted portion 61 will be described later.

Additionally, an annular portion 56 is attached to the end portion on the one axial side N of the shaft 22. The annular portion 56 is disposed on the one axial side N of the resolver rotor 282. The annular portion 56 covers the resolver rotor 282 from the one axial side N. That is, the housing 5 further has the annular portion 56 fixed to the shaft 22. The annular portion 56 is fixed between the resolver rotor 282 fixed to the shaft 22 and the contacted portion 61, and covers a part of the resolver rotor 282 from the one axial side N. By covering a part of the resolver rotor 282 with the annular portion 56, it is possible to curb intrusion of wear powder or the like of the contact 6 or the contacted portion 61 into the resolver 28. As a result, the motor assembly 1 can be driven stably for a long period of time.

The gear accommodation portion 54 has a recessed shape opened to the one axial side N. The gear accommodation portion 54 has a second tube portion 541 and a closing portion 542. An end portion on the one axial side N of the second tube portion 541 is attached to the side plate 510. The second tube portion 541 has a shape overlapping an outer edge portion of the side plate 510 in the axial direction. The second tube portion 541 is fixed to the side plate 510 while being in close contact with and in electrical contact with the side plate 510.

The second tube portion 541 is fixed to the side plate 510 by screwing, for example, but the method is not limited thereto. For example, a fixing method capable of firmly fixing the second tube portion 541 to the side plate 510, such as welding or press-fitting, can be widely adopted. An opening of the gear accommodation portion 54 is covered by the side plate 510.

The second tube portion 541 and the closing portion 542 are formed of a single member. The closing portion 542 has a plate shape expanding radially inward from an end portion on the other axial side T of the second tube portion 541. A space surrounded by the second tube portion 541, the closing portion 542, and the side plate 510 is the gear accommodation space 502. The end portion on the other axial side T of the shaft 22 is rotatably supported by the closing portion 542 through the third bearing 43.

A second drive shaft passage hole 543 is formed in the closing portion 542. The second drive shaft passage hole 543 is a hole axially penetrating the closing portion 542. The output shaft 33 penetrates the second drive shaft passage hole 543 in a rotatable state. An oil seal (not shown) is provided between the output shaft 33 and the second drive shaft passage hole 543 to curb leakage of the lubricating oil CL. An axle (not shown) for rotating the wheel is connected to the tip end of the output shaft 33. Note that the output shaft 33 rotates about a differential axis J5.

The inside of the housing 5 is filled with the lubricating oil CL for lubricating gears and bearings of the gear portion 3. In the motor assembly 1, the oil is also used for cooling the motor 2. That is, the lubricating oil CL for lubricating the motor assembly 1 is a coolant to cool the motor.

As illustrated in FIG. 1, the lubricating oil CL is stored in a lower region of the gear accommodation space 502. That is, a coolant (lubricating oil CL) for cooling the stator 25 is stored inside the housing 5. A part of the differential portion 32 is immersed in the lubricating oil CL stored in the lower region of the gear accommodation space 502. The lubricating oil CL stored in the lower region of the gear accommodation space 502 is scraped up by the operation of the differential portion 32 and diffused into the gear accommodation space 502. The oil diffused into the gear accommodation space 502 is supplied to each gear disposed inside the gear accommodation space 502 and used for lubrication. Additionally, a part of the lubricating oil CL diffused into the gear accommodation space 502 is also supplied to each bearing and used for lubrication.

As illustrated in FIG. 1, an oil reserve tray 57 is disposed in an upper region of the gear accommodation space 502. The oil reserve tray 57 opens upward. The scraped lubricating oil CL moves upward in the gear accommodation space 502 and flows into the oil reserve tray 57.

The lubricating oil CL accumulated in the oil reserve tray 57 flows into the hollow portion 221 of the shaft 22 from the inlet 220 at the end portion on the other axial side T of the shaft 22 through an oil supply path (not shown). The lubricating oil CL in the hollow portion 221 of the shaft 22 flows toward the one axial side N. The lubricating oil CL having flowed through the hollow portion 221 is sprayed toward the stator 25. As a result, the lubricating oil CL cools the stator 25.

Since the shaft 22 has a tubular shape, even when the lubricating oil CL is caused to flow into the hollow portion 221 of the shaft 22, the lubricating oil CL can be drawn from the inlet 220 by negative pressure generated by the airflow flowing out to the one axial side N during rotation of the shaft 22. As a result, the lubricating oil CL can be supplied to the entire motor 2, and the motor 2 can be cooled stably. Hence, the motor 2 can be driven stably.

The motor assembly 1 has a coolant circulation portion 7 that circulates the lubricating oil CL. The coolant circulation portion 7 has a pipe portion 71, a pump 72, an oil cooler 73, and a motor oil reservoir 74.

The pipe portion 71 is a pipe formed in the housing 5. The pipe portion 71 connects the pump 72 and the motor oil reservoir 74 disposed inside the first tube portion 511, and supplies the lubricating oil CL to the motor oil reservoir 74. The pump 72 sucks the lubricating oil CL stored in the lower region of the gear accommodation space 502. The pump 72 is an electric pump, but is not limited thereto. For example, the motor assembly 1 may be driven using a part of the output of the output shaft 33 of the motor assembly 1.

The oil cooler 73 is disposed between the pump 72 of the pipe portion 71 and the motor oil reservoir 74. That is, the lubricating oil CL sucked by the pump 72 is sent to the motor oil reservoir 74 passing the oil cooler 73 and through the pipe portion 71. For example, a refrigerant such as water supplied from the outside is supplied to the oil cooler 73. Then, heat is exchanged between the refrigerant and the lubricating oil CL to lower the temperature of the lubricating oil CL. Note that while the oil cooler 73 used herein is a liquid-cooled type using a refrigerant, the oil cooler is not limited thereto, and may be a so-called air-cooled type that cools with traveling air of the vehicle. By using the oil cooler 73, the temperature of the lubricating oil CL supplied to the motor oil reservoir 74 can be lowered, and the cooling efficiency of the motor 2 can be enhanced.

The motor oil reservoir 74 is a tray disposed in the upper region of the motor accommodation space 501 and opened upward. More specifically, the motor oil reservoir 74 is disposed vertically above the stator 25 in the motor accommodation space 501. A dropping hole is formed in a bottom portion of the motor oil reservoir 74, and the motor 2 is cooled by dropping the lubricating oil CL from the dropping hole. The dropping hole is formed above the coil end 271 of the coil 27 of the stator 25, for example, and the coil 27 is cooled by the lubricating oil CL.

The contact 6 is in contact with the contacted portion 61 formed at the end portion on the one axial side N of the shaft 22. The contacted portion 61 is made of a material having higher conductivity than a bearing contact portion 222 in contact with the inner ring of the bearing of the shaft 22. That is, the conductivity of the contacted portion 61 is higher than the conductivity of the bearing contact portion 222 in contact with the bearing 41 of the shaft 22. The contacted portion 61 is brought into contact with a brush portion 63, which will be described later, of the contact 6.

By making the conductivity of the contacted portion 61 higher than that of the bearing contact portion 222 in contact with the bearing 41 of the shaft 22, most of the axial current generated in the shaft 22 can flow to the contact 6 in contact with the contacted portion 61. As a result, a potential difference between the inner ring and the outer ring of the bearing can be curbed, and electric corrosion of the bearing can be curbed effectively. Note that although the first bearing 41 has been described, the potential difference between the inner ring and the outer ring is similarly curbed and electric corrosion is curbed in other bearings as well.

Note that the contacted portion 61 is a conductive film of silver, copper, or the like, and is formed by applying a metal paste, for example. Note that the contacted portion 61 may be formed by a film forming method such as plating or vapor deposition, in addition to coating. The electric corrosion of the bearing will be described later. Additionally, if the contact 6 can be electrically conducted sufficiently, the contacted portion 61 may be a part of the shaft 22.

As illustrated in FIGS. 2 and 3, the contact 6 has the contact ring 62 and the brush portion 63. The contact ring 62 has an annular shape and is made of a conductive material such as metal. The contact ring 62 is disposed in the contact fixing recess 531 of the cover 53. The contact ring 62 is fixed to the contact fixing recess 531 by press fitting. However, the fixing method is not limited to this, and a method of firmly fixing the contact ring 62 to the contact fixing recess 531, such as adhesion and welding, can be widely adopted.

The brush portion 63 is a material that has conductivity and can be bent in the circumferential direction. The brush portion 63 is fixed to an inner peripheral surface of the contact ring 62 and is electrically connected to the contact ring 62. That is, the contact 6 is electrically connected to the housing 5 including the cover 53.

The brush portion 63 protrudes radially inward. The length from the inner peripheral surface of the contact ring 62 to the axially inner tip end of the brush portion 63 is longer than the radial distance between the contact ring 62 and the contacted portion 61. For this reason, the radially inner tip end of the brush portion 63 elastically bends and comes into contact with the contacted portion 61. That is, the contact 6 has conductivity and is fixed to the housing 5. The contact 6 comes into contact with the contacted portion 61 provided at the end portion on the one axial side N of the shaft 22.

Since the contacted portion 61 is formed on the outer peripheral surface of the shaft 22, the radially inner tip end of the brush portion 63 continues to contact the contacted portion 61 even when the shaft 22 moves in the axial direction. That is, even when the shaft 22 moves in the axial direction, the conductive state between the shaft 22 and the housing 5 is maintained.

In the present example embodiment, a wire made of carbon fiber is used as the brush portion 63, but the present disclosure is not limited thereto. A wire made of a member that is elastically deformable and has conductivity can be widely adopted. Additionally, the brush portion is not limited to the wire, and may have a film shape having a width in the rotation axis J2 direction and a thickness in the circumferential direction.

As illustrated in FIG. 1, an end portion on the one axial side N of the shaft main body 223 is rotatably supported by the bearing holder 52 through the first bearing 41. The shaft 22 penetrates the through hole 520 and protrudes to the one axial side N. Then, the resolver rotor 282 of the resolver 28 is attached to the one axial side N of the through hole 520 of the shaft 22.

When the contact 6 is attached to the contact fixing recess 531 of the cover 53, the radially inner tip end of the brush portion 63 of the contact 6 comes into contact with the contacted portion 61 on the outer peripheral surface of the shaft 22. Since the brush portion 63 deforms elastically, the radially inner tip end of the brush portion 63 deforms along the contacted portion 61 and comes into contact with the contacted portion 61, so that the brush portion 63 and the contacted portion 61 are electrically connected. As a result, the shaft 22 and the contact 6 are electrically connected.

Since the brush portion 63 is made of an elastically deformable material, the electrical connection between the shaft 22 and the contact 6 is maintained even when the shaft 22 rotates. For this reason, the shaft 22 and the housing 5, that is, the inner ring attached to the shaft 22 and the outer ring attached to the housing 5 of each of the first bearing 41 to the fourth bearing 44 have the same potential, and electric corrosion of the bearing due to discharge generated on the basis of the potential difference is curbed. As a result, variations in the rotation of the shaft 22 are suppressed, and the motor assembly 1 can be driven stably for a long period of time. In other words, the life of the motor assembly 1 can be prolonged.

Additionally, since the rotor 21 and the stator 25 of the motor 2 can be cooled stably with the lubricating oil CL, a decrease in output due to a temperature rise of the motor 2 can be curbed. That is, in the motor assembly 1, a decrease in output can be curbed over a long period of time.

As illustrated in FIG. 1, the inner diameter of the end portion on the one axial side N of the hollow portion 221 of the shaft 22 may be formed smaller than the inner diameter on the other axial side T. A step is formed on the one axial side N of the hollow portion 221. As a result, even when the shaft 22 is inclined so that the one axial side N is lower than the other axial side T, the flow of the coolant CL is curbed by the step formed on the one axial side N of the shaft 22. As a result, it is possible to curb entry of the coolant CL into an area between the contact 6 and the contacted portion 61 from the one axial side N of the shaft 22 to form an oil film, and to curb an increase in electric resistance between the housing 5 and the shaft 22 due to the oil film.

Figure 4:
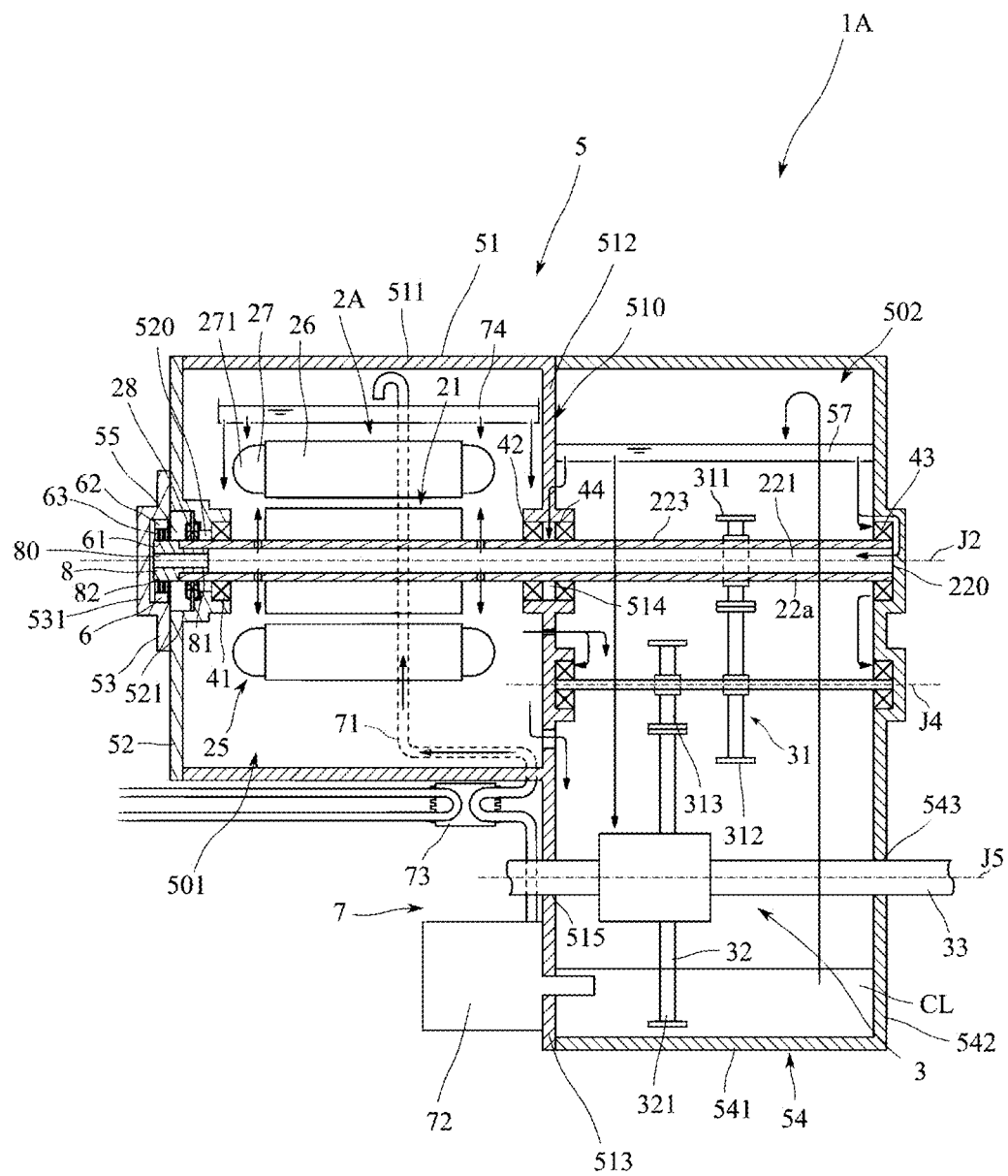
FIG. 4 is a conceptual diagram of a motor assembly of a first modification of an example embodiment of the present disclosure.
Figure 5:
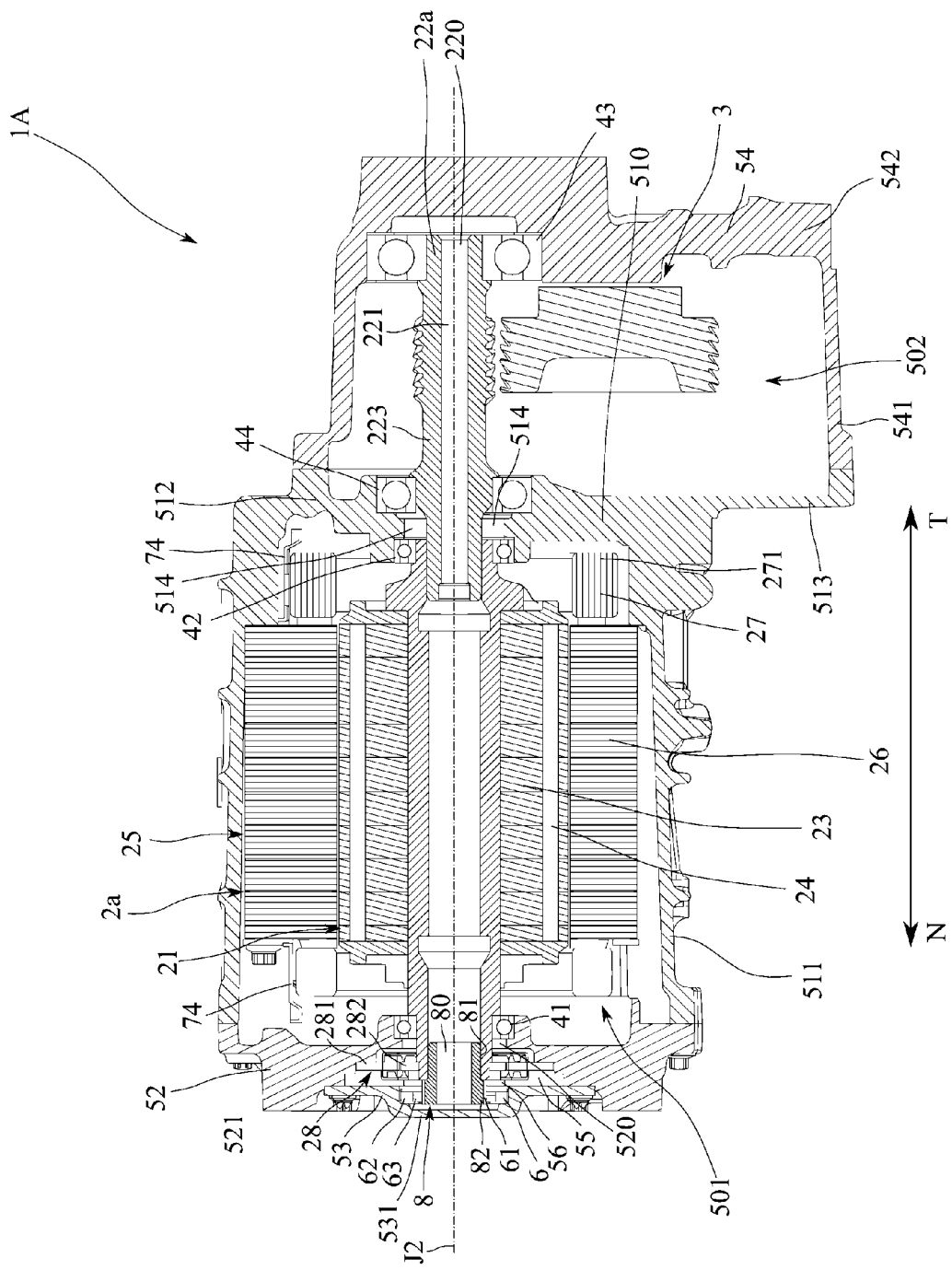
FIG. 5 is a cross-sectional view taken along a plane including a rotation axis of the motor assembly of the first modification.
Figure 6:
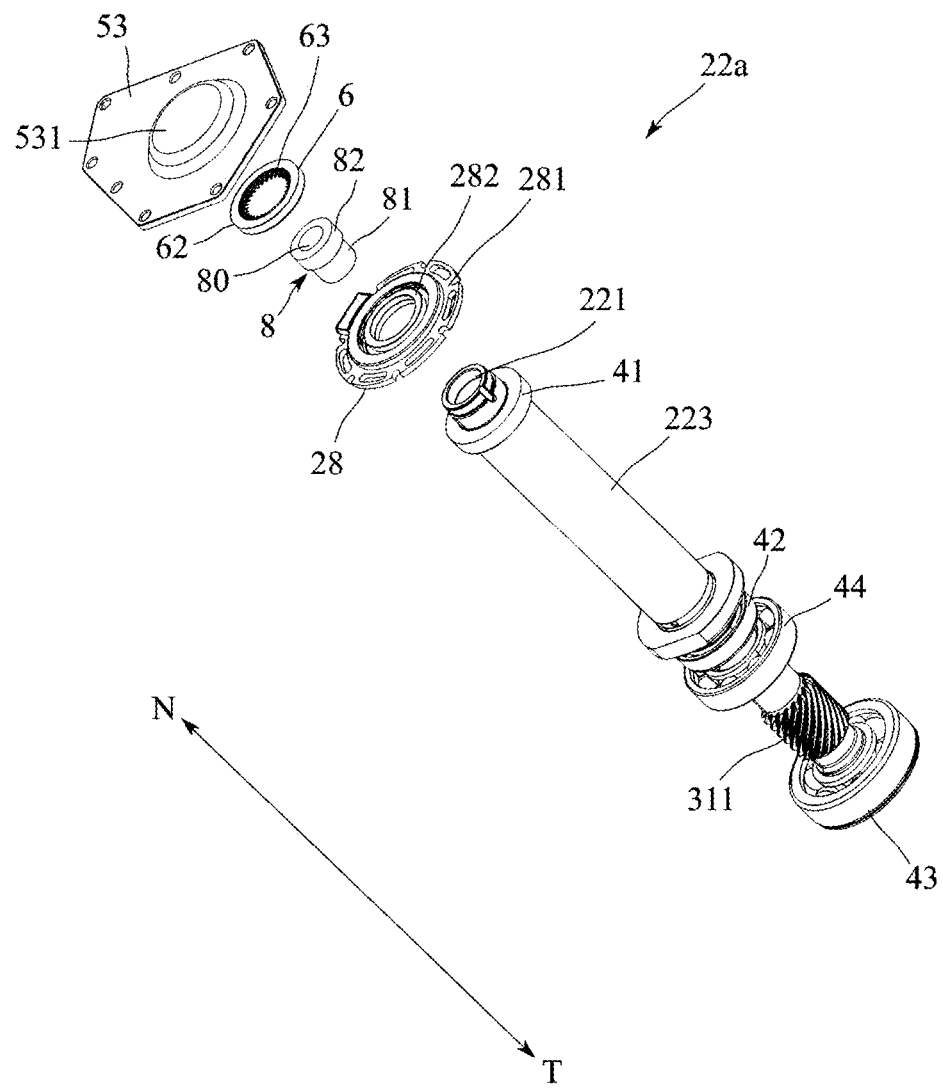
FIG. 6 is an exploded perspective view of a shaft of the first modification.
Figure 7:
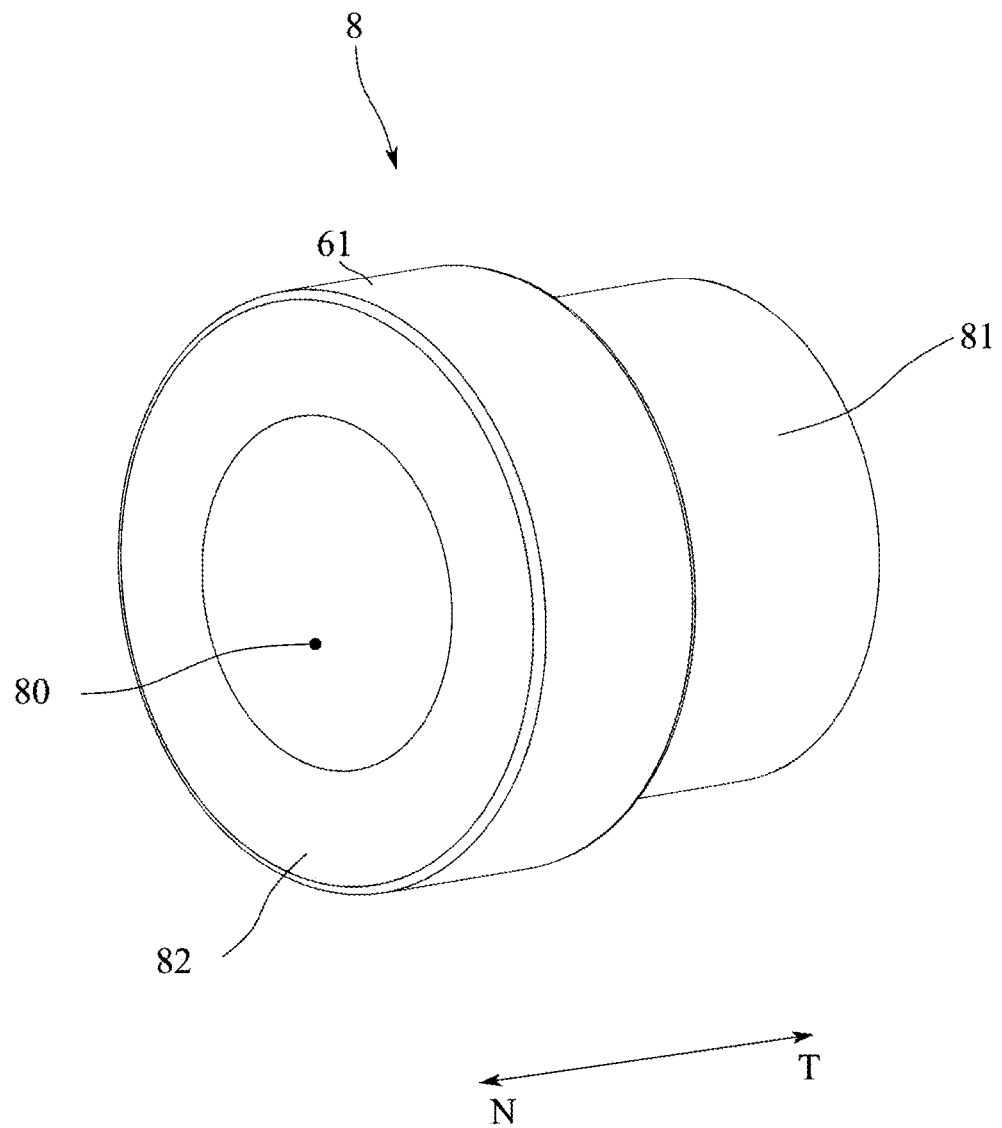
FIG. 7 is a perspective view of an extension shaft of an example embodiment of the present disclosure.

FIG. 4 is a conceptual diagram of a motor assembly 1A of a first modification. FIG. 5 is a cross-sectional view taken along a plane including a rotation axis J2 of the motor assembly 1A. FIG. 6 is an exploded perspective view of a shaft 22a. FIG. 7 is a perspective view of an extension shaft 8. The motor assembly 1A of the first modification is different from the motor assembly 1 illustrated in FIG. 1 and the like in that the shaft 22a has the extension shaft 8 and a contacted portion 61 is formed on the extension shaft 8. The same configuration is adopted for other points. Hence, parts of the motor assembly 1A that are substantially the same as those of the motor assembly 1 are denoted by the same reference numerals, and detailed description of the same parts will be omitted.

As illustrated in FIGS. 4 to 6, the shaft 22a of the motor assembly 1A has a shaft main body 223 and the extension shaft 8. The extension shaft 8 is fixed to an end portion on the one axial side N of the shaft main body 223. The extension shaft 8 is made of a conductive material such as iron or aluminum. Note that in order to curb contact corrosion of dissimilar metals at the contact portion, at least the portion of the extension shaft 8 in contact with the shaft main body 223 is preferably formed of the same kind of metal as the shaft main body 223. That is, the shaft 22a has the shaft main body 223 and the extension shaft 8 having conductivity and fixed to the end portion on the one axial side N of the shaft main body 223.

As illustrated in FIGS. 4 to 7, the extension shaft 8 has a fixing portion 81 fixed to the shaft main body 223. The fixing portion 81 is inserted into a hollow portion 221 from an end portion on the one axial side N of the hollow portion 221 of the shaft main body 223. Then, an outer peripheral surface of the fixing portion 81 comes into contact with and is fixed to an inner peripheral surface of the hollow portion 221. That is, the extension shaft 8 has the fixing portion 81 fixed to the shaft main body 223. Additionally, the contacted portion 61 is formed in the extension shaft 8. The contacted portion 61 is made of a material having higher conductivity than the fixing portion 81. That is, the conductivity of the contacted portion 61 is higher than the conductivity of the fixing portion 81.

The extension shaft 8 has a flange portion 82 expanding radially outward from an end portion on the one axial side N. The flange portion 82 is circular as viewed from the axial direction. In the extension shaft 8, the contacted portion 61 is formed on an outer surface of the flange portion 82. That is, the contacted portion 61 is formed on at least a part of the outer surface of the flange portion 82. The contacted portion 61 is a conductive film of silver, copper, or the like, and is formed by applying a metal paste, for example. That is, the contacted portion 61 is a conductive film formed of a material having higher conductivity than the material forming the flange portion 82. Note that as a method of manufacturing the contacted portion 61, a film may be formed by a film forming method such as plating or vapor deposition, in addition to coating. As described above, by forming the contacted portion 61 on a part of the outer surface of the flange portion 82, the amount of metal forming the contacted portion 61 can be reduced, and the cost required for manufacturing can be reduced.

The outer diameter of the flange portion 82 is larger than the inner diameter of the hollow portion 221. Of the extension shaft 8, the other axial side T of the flange portion 82 is the fixing portion 81. That is, the fixing portion 81 is formed on the other axial side T of the flange portion 82. Additionally, the fixing portion 81 is disposed in the hollow portion 221 provided at the end portion on the one axial side N of the shaft main body 223, and is brought into contact with and fixed to the inner surface of the hollow portion 221.

As a result, the shaft main body 223 and the extension shaft 8 are electrically connected. The fixing portion 81 is fixed to the shaft 22a by press-fitting, but the method is not limited thereto. A fixing method capable of firmly fixing the fixing portion 81 to the shaft main body 223 while maintaining the electrical connection between the fixing portion 81 and the shaft main body 223 can be widely adopted.

Additionally, at least the flange portion 82 of the extension shaft 8 is disposed inside the accommodation space 55 of the housing 5. Hence, the contacted portion 61 disposed in the flange portion 82 is disposed inside the accommodation space 55.

When the fixing portion 81 is disposed on the one axial side N of the hollow portion 221 of the shaft main body 223, the flange portion 82 comes into contact with the end portion on the one axial side N of the shaft main body 223. As a result, the extension shaft 8 is positioned and fixed on the one axial side N of the shaft main body 223. Thus, the flange portion 82 can accurately face a contact ring 62 in the radial direction.

Since the fixing portion 81 which is a part of the extension shaft 8 is inserted into the end portion of the hollow portion 221 of the shaft 22, the length of the extension shaft 8 protruding in the axial direction from the end portion of the shaft main body 223 can be shortened. As a result, it is possible to electrically connect the shaft 22 and the housing 5 while curbing an increase in size of the motor assembly 1 and to curb electric corrosion of the bearing.

The contacted portion 61 is formed on the outer peripheral portion of the flange portion 82. As a result, since the contacted portion 61 is the outer surface of the radially outer edge of the flange portion 82, the contact 6 and the extension shaft 8, that is, the shaft 22a can continue to be in a conductive state even if the shaft 22a moves in the axial direction.

Since the contacted portion 61 is formed using a conductive film, a material other than the contacted portion 61 of the extension shaft 8 can be widely selected from materials having a certain level of conductivity or more. For example, by forming the extension shaft 8 with a member having a certain strength and conductivity or more and forming the contacted portion 61 having a conductivity higher than that of the material of the extension shaft 8, it is possible to keep the electric resistance with the contact 6 low while maintaining the strength of the extension shaft 8. As a result, the shaft 22a and the housing 5 can be brought into a conductive state in a reliable manner.

Further, the extension shaft 8 has a through hole 80 penetrating along the rotation axis J2. That is, the extension shaft 8 has a tubular shape penetrating in the axial direction. As illustrated in FIG. 5, the hollow portion 221 penetrates in the axial direction, and the shaft main body 223 has an inlet 220 for allowing a coolant (lubricating oil CL) to flow into an end portion on the other axial side T. The extension shaft 8 has the through hole 80. For this reason, even after the extension shaft 8 is attached to the end portion on the one axial side N of the shaft main body 223, the shaft 22a maintains the state of penetrating in the axial direction.

As a result, it is possible to avoid blockage of the hollow portion of the shaft main body 223. For example, even in the case of wiring a conductive wire in the hollow portion 221 of the shaft main body 223, the extension shaft 8 is less likely to be an obstacle. Additionally, the weight of the shaft 22a can be reduced. Further, since the extension shaft 8 has a tubular shape and is disposed on the opposite side of the inlet 220 of the shaft main body 223, the extension shaft 8 is less likely to obstruct generation of negative pressure in the hollow portion 221 during rotation of the shaft 22a. As a result, since the oil flowing in from the inlet 220 is pulled in the hollow portion 221 in the axial direction by the negative pressure, the oil can be sent to a part far from the inlet 220 in the axial direction.

As illustrated in FIG. 5, the inner diameter of the extension shaft 8 is smaller than the inner diameter of the hollow portion 221. With such a configuration, even when the shaft 22a is inclined so that the one axial side N is lower than the other axial side T, it is possible to curb entry of the coolant (lubricating oil CL) into the extension shaft 8 due to the step created by the difference between the inner diameter of the shaft main body 223 and the inner diameter of the extension shaft 8. As a result, it is possible to curb entry of the coolant (lubricating oil CL) into an area between the contact 6 and the contacted portion 61 from the one axial side N of the shaft 22a to form an oil film, and to curb an increase in electric resistance between the housing 5 and the shaft 22a due to the oil film.

For example, when the motor assembly 1 is used as a power source of an automobile, the one axial side N of the shaft 22a may be located below the other axial side T depending on the stopped state of the automobile. In this case, the lubricating oil CL easily flows to the one axial side N through the hollow portion 221, but the flow is restricted at the step portion, so that leakage of the lubricating oil CL from the end portion on the other axial side T of the hollow portion 221 can be curbed.

As a result, adhesion of the insulating lubricating oil CL to the brush portion 63 is curbed, and an increase in electric resistance between the brush portion 63 and the contacted portion 61 is curbed. As a result, the potential difference between the shaft 22a and the housing 5 can be reduced.

Additionally, the entire extension shaft 8 may be formed of a single member. This eliminates the need for the step of joining the flange portion 82. As a result, the manufacturing process of the extension shaft 8 can be simplified. Additionally, since the joint can be omitted, the lubricating oil CL flowing inside is less likely to leak, and a decrease in lubricating efficiency can be curbed.

Figure 8:
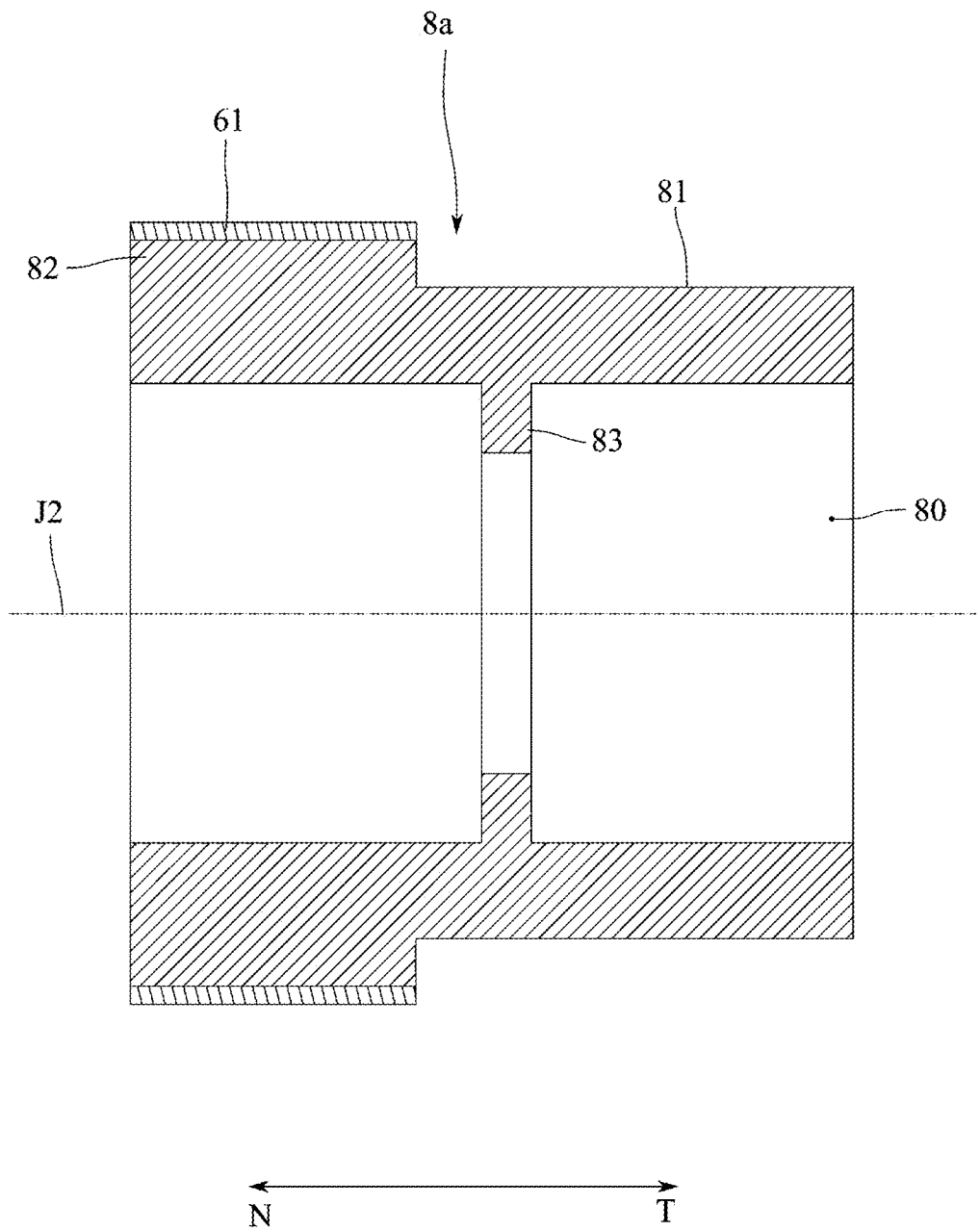
FIG. 8 is a cross-sectional view of an extension shaft of a second modification of an example embodiment of the present disclosure.

FIG. 8 is a cross-sectional view of an extension shaft 8a of a second modification. The extension shaft 8a illustrated in FIG. 8 has an inner flange portion 83 protruding in the radial direction at an intermediate portion of an inner surface of a through hole 80. The extension shaft 8a has the same configuration as the extension shaft 8 illustrated in FIG. 4 and the like except for having the inner flange portion 83. Hence, parts of the extension shaft 8a that are substantially the same as those of the extension shaft 8 are denoted by the same reference numerals, and detailed description of the same parts will be omitted. Additionally, the extension shaft 8a is a part of a shaft 22a.

As illustrated in FIG. 8, the extension shaft 8a further has the annular inner flange portion 83 expanding radially inward from an inner peripheral surface of the through hole 80. By providing the inner flange portion 83, it is possible to keep the lubricating oil CL more effectively from flowing out from an end portion on the one axial side N of the shaft 22a. Note that the inner flange portion 83 has a through hole large enough to generate a negative pressure that can pull the lubricating oil in a hollow portion 221 of a shaft main body 223.

For example, when the motor assembly 1 is used as a power source of an automobile, the one axial side N of the shaft 22a may be located below the other axial side T depending on the stopped state of the automobile. In this case, the lubricating oil CL easily flows to the one axial side N through the hollow portion 221. However, by including the inner flange portion 83, leakage of the lubricating oil CL from the one axial side N of the hollow portion 221 can be curbed even when the inclination of the shaft 22a is large.

Note that the inner flange portion 83 may be formed as a single member with the extension shaft 8a. Additionally, the inner flange portion 83 may have an annular portion fixed to the through hole 80 of the extension shaft 8a. Examples of the fixing method include press fitting, but are not limited thereto, and a method of fixing the inner flange portion 83 firmly to the through hole 80 can be widely adopted. Additionally, the inner diameter of the extension shaft 8a on the one axial side N of the axially intermediate portion of the through hole 80 may be formed smaller than the inner diameter of the extension shaft 8a on the other axial side T. With this a configuration, the extension shaft 8a can be manufactured more easily.

Note that the through hole of the inner flange portion 83 preferably has an area that allows air to flow to such an extent that a negative pressure that can suck the lubricating oil CL can be generated.

Figure 9:
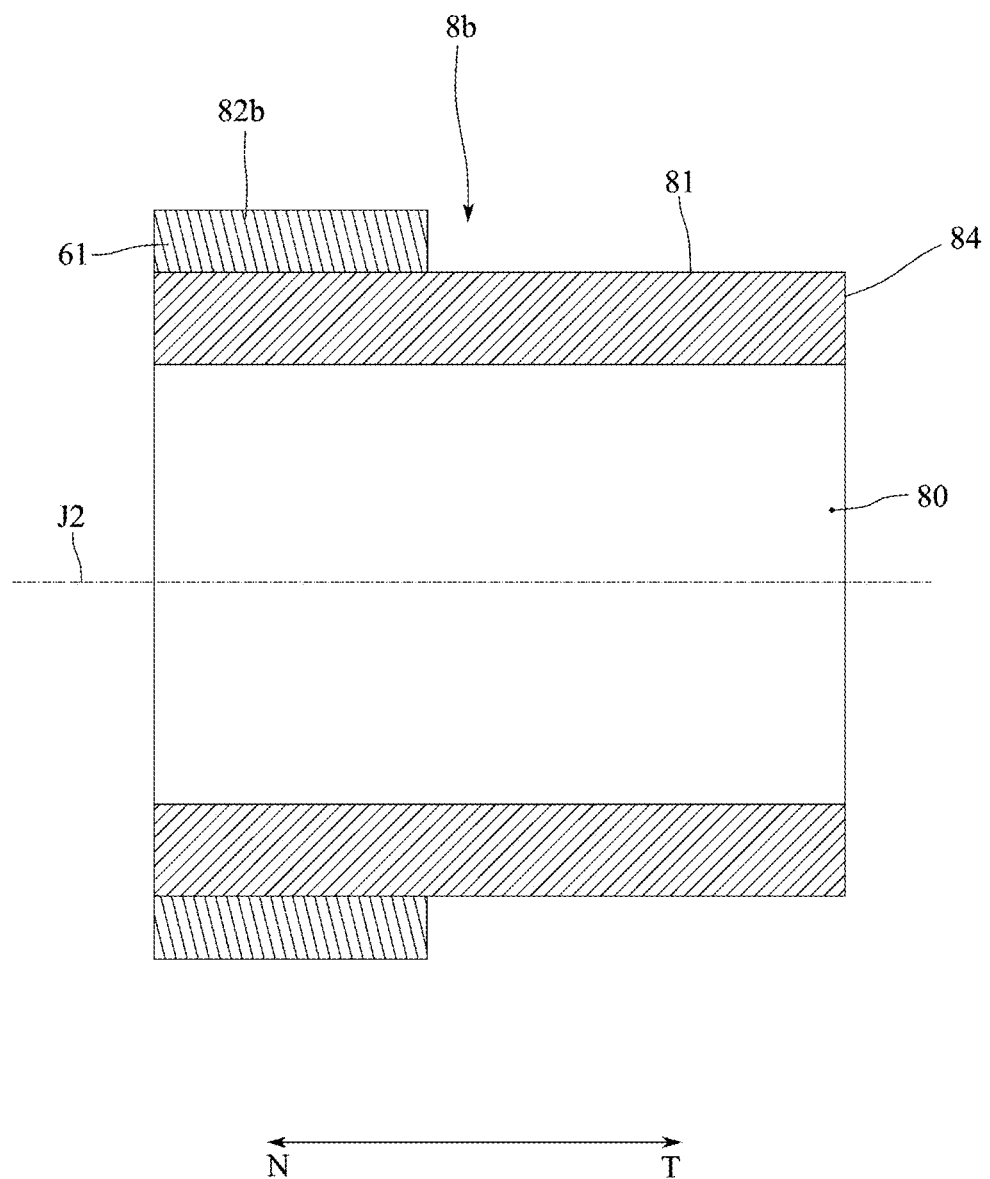
FIG. 9 is a cross-sectional view of an extension shaft of a third modification of an example embodiment of the present disclosure.

FIG. 9 is a cross-sectional view of an extension shaft 8b of a third modification. The extension shaft 8b illustrated in FIG. 9 is different from the extension shaft 8 in that the extension shaft 8b has a flange portion 82b attached to a column portion 84. In other respects, the extension shaft 8b illustrated in FIG. 9 has the same configuration as the extension shaft 8 illustrated in FIG. 4 and the like. Hence, parts of the extension shaft 8b that are substantially the same as those of the extension shaft 8 are denoted by the same reference numerals, and detailed description of the same parts will be omitted. Additionally, the extension shaft 8b is a part of a shaft 22a.

As illustrated in FIG. 9, the extension shaft 8b has the column portion 84 and the flange portion 82b. The flange portion 82b has an annular shape and is press-fitted into an outer peripheral surface of the column portion 84. Then, the other axial side T of the portion of the column portion 84 to which the flange portion 82b is attached is a fixing portion 81. The entire flange portion 82b is formed of a member having higher conductivity than the column portion 84. That is, the entire flange portion 82b is a contacted portion 61. That is, the flange portion 82b is made of a material having higher conductivity than the fixing portion 81.

With this configuration, the step of forming a conductive film can be omitted. Additionally, since the entire flange portion 82b is the contacted portion 61, even if the contacted portion 61 is worn due to the contact of the contact 6 with the brush portion 63, the contact state between the extension shaft 8b and the contact 6 can be maintained. As a result, conduction between the shaft 22a and the housing 5 can be maintained over a long period of time, and electric corrosion of the bearing can be curbed.

Note that as a method of fixing the flange portion 82*b* to the column portion 84, press-fitting is exemplified, but the method is not limited thereto. Methods by which the flange portion 82*b* can be fixed firmly to the column portion 84, such as welding, depositing, and adhesion, can be widely adopted.

Figure 10:
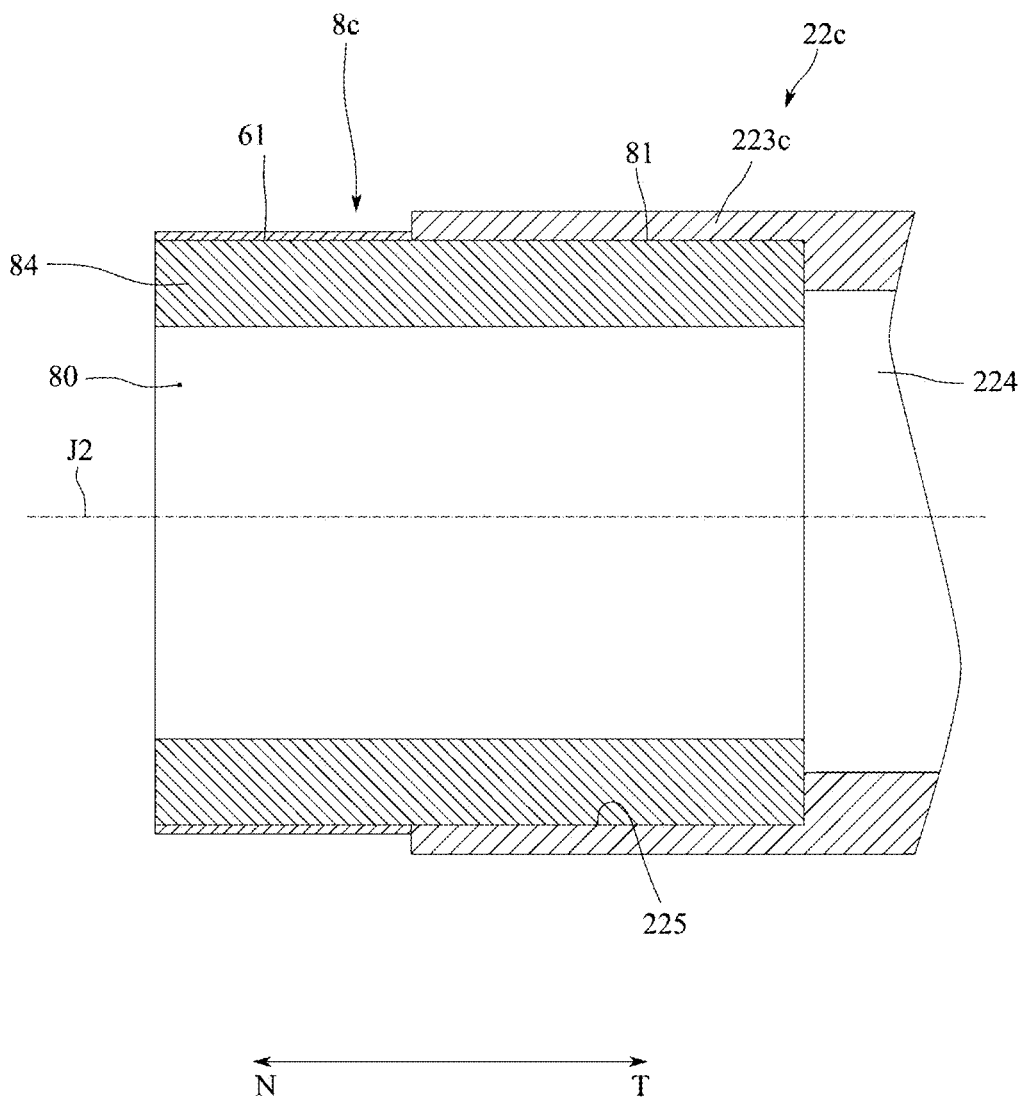
FIG. 10 is a cross-sectional view of an extension shaft of a fourth modification of an example embodiment of the present disclosure.

FIG. 10 is a cross-sectional view of an extension shaft 8*c* of a fourth modification. The extension shaft 8*c* illustrated in FIG. 10 is different from the extension shaft 8 in that the extension shaft 8*c* does not have a flange portion. Additionally, a shaft main body 223*c* of a shaft 22*c* has a wide opening portion 225 having a wide inner diameter at an end portion on the one axial side N of a hollow portion 224. In other respects, the extension shaft 8*c* and the shaft 22*c* illustrated in FIG. 10 have the same configurations as the extension shaft 8 and the shaft 22*a* illustrated in FIG. 4 and the like. Hence, parts of the extension shaft 8*c* and the shaft 22*c* that are substantially the same as those of the extension shaft 8 and the shaft 22*a* are denoted by the same reference numerals, and detailed description of the same parts will be omitted.

As illustrated in FIG. 10, by having the wide opening portion 225 at the end portion on the one axial side N of the hollow portion 224, a step portion is formed at the end portion on the one axial side N of the hollow portion 224. Then, the extension shaft 8*c* has a contacted portion 61 on an outer peripheral surface of the end portion on the one axial side N of a column portion 84 having a cylindrical shape with a uniform outer shape over the entire axial region.

A fixing portion 81 of the extension shaft 8*c* is press-fitted from the end portion on the one axial side N of the hollow portion 224. At this time, the end portion on the other axial side T of the extension shaft 8*c* comes into contact with the step on the other axial side T of the wide opening portion 225. As a result, even the extension shaft 8*c* having no flange portion can be positioned in the axial direction when the extension shaft 8*c* is press-fitted. As a result, a brush portion 63 of a contact 6 can be accurately brought into contact with the contacted portion 61, and a potential difference between the shaft 22*c* and a housing 5 can be reduced.

Figure 11:
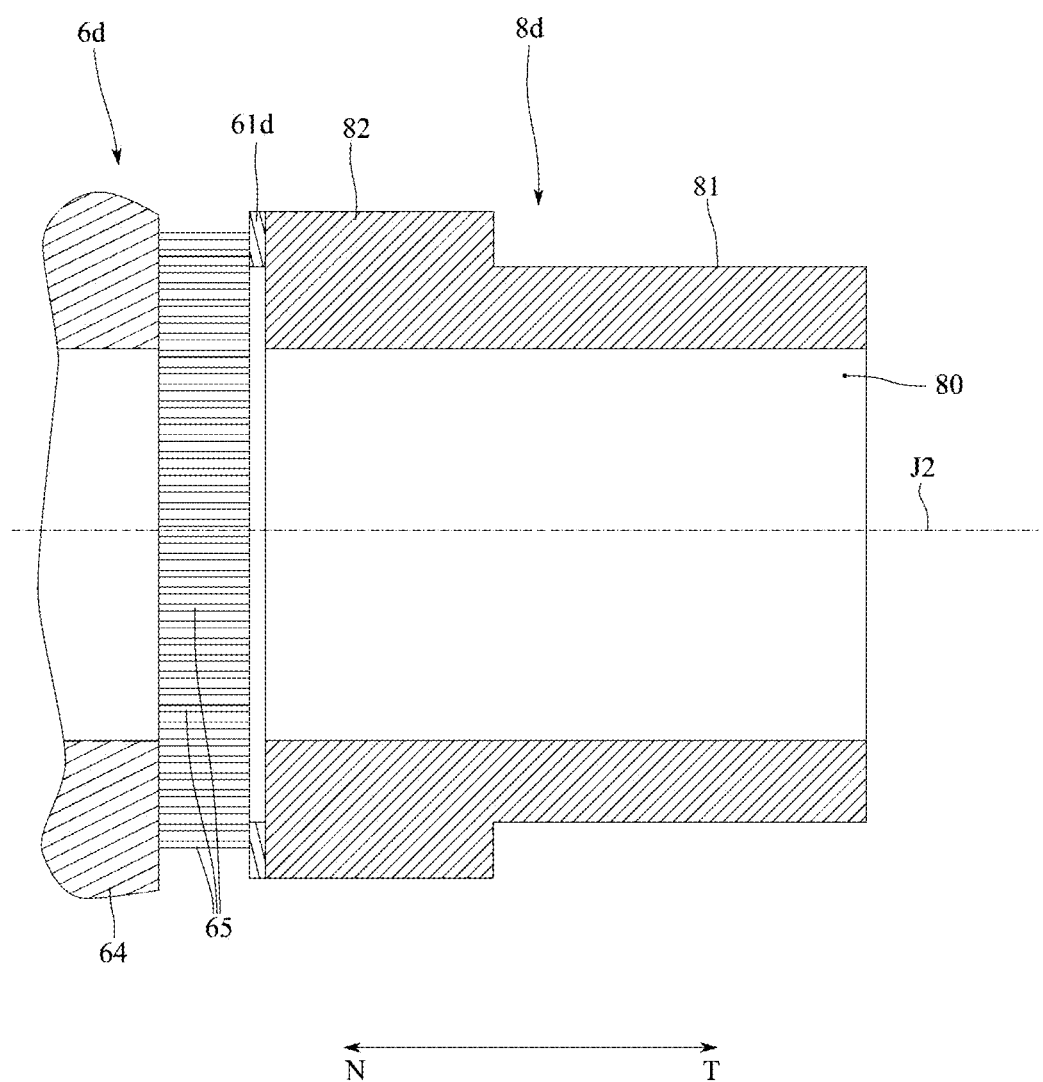
FIG. 11 is a cross-sectional view of a motor assembly of a fifth modification of an example embodiment of the present disclosure.

FIG. 11 is a cross-sectional view around an extension shaft 8*d* of a motor assembly according to a fifth modification. A contacted portion 61*d* and a contact 6*d* of the extension shaft 8*d* illustrated in FIG. 8 are different from the extension shaft 8 and the contact 6 illustrated in FIG. 4 and the like. The other points have substantially the same configuration. Hence, parts of the extension shaft 8*d* that are substantially the same as those of the extension shaft 8 are denoted by the same reference numerals, and detailed description thereof will be omitted.

As illustrated in FIG. 11, the contacted portion 61*d* formed in the extension shaft 8*d* is formed on an end surface on the one axial side N of a flange portion 82. Additionally, the contact 6*d* has a contact ring 64 and a brush portion 65. The contact ring 64 has an annular shape, and its center coincides with a rotation axis J2. Then, an end surface on the other axial side T of the contact ring 64 faces the end surface on the one axial side N of the flange portion 82 in the axial direction. Then, the brush portion 65 extends from the end surface on the other axial side T of the contact ring 64 to the other axial side T.

Then, the brush portion 65 is disposed in a bent state, and the tip end of the brush portion 65 on the other axial side T comes into contact with the contacted portion 61*d* of the extension shaft 8*d*. As a result, the brush portion 65 is electrically connected to the contacted portion 61*d*. Additionally, even when the extension shaft 8*d* rotates with rotation of a shaft 22*a*, the contact state between the brush portion 65 and the contacted portion 61*d* is maintained. That is, the shaft 22*a* and a housing 5 are electrically connected even while a motor 2A is driven. As a result, it is possible to curb electric corrosion of the bearing.

Figure 12:
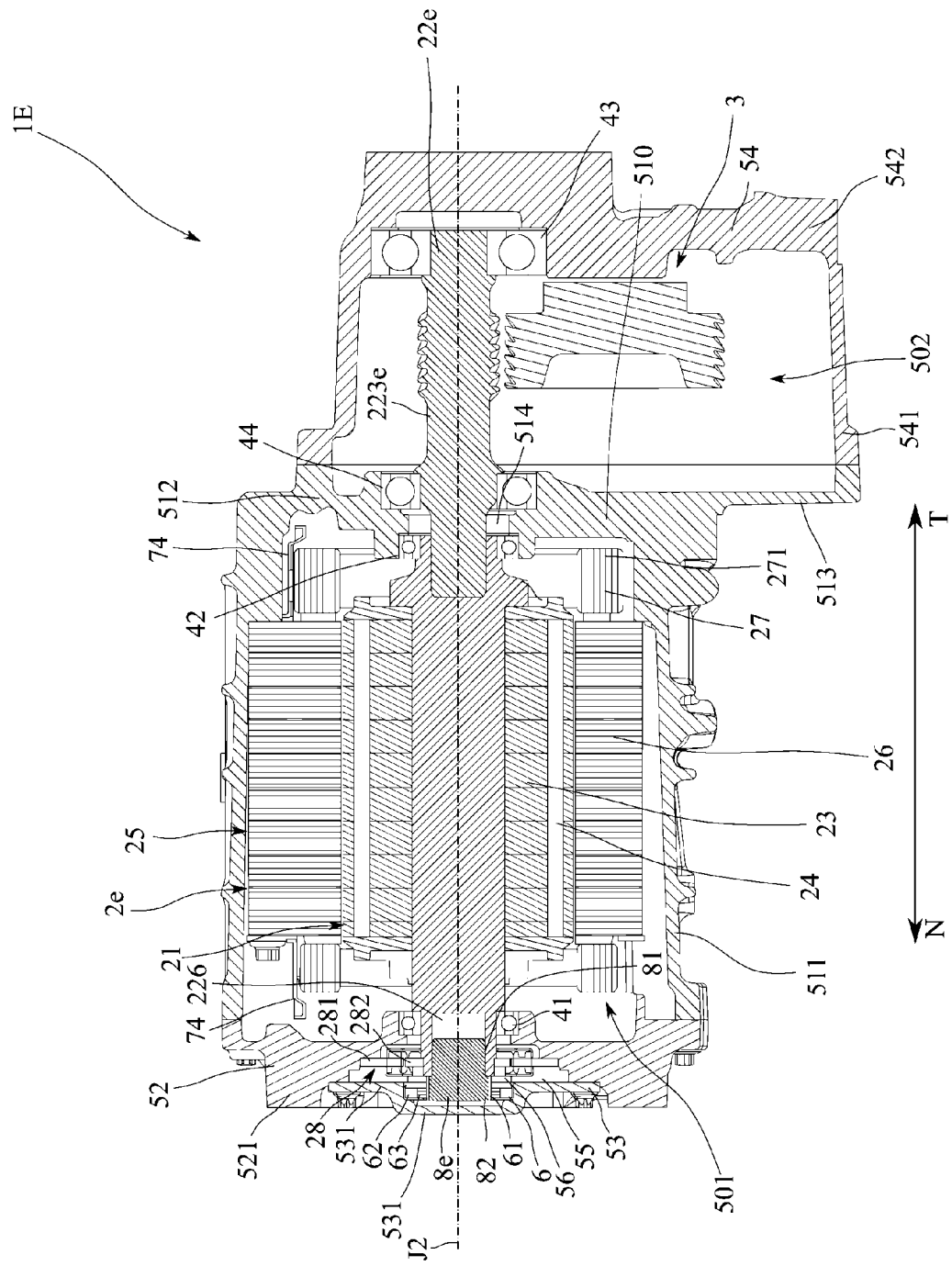
FIG. 12 is a cross-sectional view of a motor assembly of a sixth modification of an example embodiment of the present disclosure.

FIG. 12 is a cross-sectional view of a motor assembly 1E of a sixth modification. As illustrated in FIG. 12, in the motor assembly 1E, a hollow portion 226 of a shaft main body 223*e* of a shaft 22*e* of a motor 2D is different from the hollow portion 221 of the shaft main body 223 of the shaft 22*a* of the motor assembly 1A. Additionally, an extension shaft 8*e* is different from the extension shaft 8 in that the extension shaft 8*e* does not have the through hole 80. The motor assembly 1E has substantially the same configuration as the motor assembly 1A illustrated in FIG. 4 except for these points. Hence, parts of the motor assembly 1E that are substantially the same as those of the motor assembly 1A are denoted by the same reference numerals, and detailed description will be omitted.

For example, in the motor assembly 1E, when it is possible to cool the motor 2E sufficiently by blowing a lubricating oil CL to a motor 2E by a coolant circulation portion 7, the lubricating oil CL need not be circulated in the shaft 22*e*. For this reason, the shaft 22*e* is a column, and the hollow portion 226 recessed in the axial direction is formed on an end surface on the one axial side N of the shaft main body 223*e*. The hollow portion 226 is a bottomed recess provided on the end surface on the one axial side N of the shaft main body 223*e* and recessed in the axial direction. That is, the shaft main body 223*e* has the hollow portion 226 opened at least at the end portion on the one axial side N.

Then, in the motor assembly 1E, the extension shaft 8*e* has no through hole. By press-fitting a fixing portion 81 of the extension shaft 8*e* into the hollow portion 226 of the shaft main body 223*e*, the extension shaft 8*e* is fixed to the end portion on the one axial side N of the shaft main body 223*e*. Thus, the extension shaft 8*e* can be attached to the shaft main body 223*e*.

Since the extension shaft 8*e* is inserted into the hollow portion 226 at the end portion of the shaft main body 223*e*, the length of the extension shaft 8*e* protruding in the axial direction from the end portion of the shaft main body 223*e* can be shortened. As a result, it is possible to downsize the part for ensuring conduction between the housing 5 and the shaft 22*e*.

In the motor assembly 1E, the extension shaft 8*e* is attached to the one axial side N of the shaft main body 223*e*, but the present disclosure is not limited thereto. The extension shaft 8*e* and the contact 6 may be disposed at the end portion on the other axial side T. Additionally, the extension shaft 8*e* and the contact 6 may be disposed at both ends in the axial direction.

While an example embodiment of the present disclosure and modifications thereof have been described above, it will be understood that features, a combination of the features, and so on according to the example embodiment are only illustrative and not restrictive, and that an addition, elimination, and substitution of a feature(s), and other modifications can be made without departing from the scope and spirit of the present disclosure. Additionally, the present disclosure is not to be limited by the example embodiment.

For example, the motor assembly of the present disclosure can be used as a drive motor for a hybrid vehicle (HV), a plug-in hybrid vehicle (PHV), and an electric vehicle (EV).

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor assembly comprising:
a motor including a rotor including a shaft rotatable about a rotation axis and a stator surrounding the rotor from radially outside;
a housing that accommodates the motor;
a bearing that is fixed to the housing and rotatably supports the shaft;
a resolver including a resolver rotor fixed to the shaft and a resolver stator fixed to the housing; and
a contact that has conductivity, is fixed to the housing, and is in contact with a contacted portion at an end portion on one axial side of the shaft; wherein
the housing includes an accommodation space in which the contacted portion of the shaft is accommodated;
the contact and the resolver are side by side in a direction along the rotation axis in the accommodation space;
the housing includes:
a housing main body that holds the stator;
a bearing holder that is provided on one axial site of the housing main body and holds the bearing on another axial side; and
a cover attached to one axial side of the bearing holder, the contact being fixed to the cover;
the contact is fixed to a surface on an axial side of the cover which is opposed to the one axial side of the bearing holder;
the solver stator is fixed to the bearing holder; and
the accommodations lace is located between the cover and the bearing holder.

2. The motor assembly according to claim 1 further comprising an annular portion fixed to the shaft; wherein
the annular portion is fixed between the resolver rotor fixed to the shaft and the contacted portion, and covers a portion of the resolver rotor from one axial side.

3. The motor assembly according to claim 1, wherein conductivity of the contacted portion is higher than conductivity of a bearing contact portion in contact with the bearing of the shaft.

4. The motor assembly according to claim 1, wherein a coolant to cool the stator is stored in the housing; and
the shaft has a tubular shape penetrating in the axial direction, and includes an inlet through which the coolant flows at an end portion on another axial side.

5. The motor assembly according to claim 1, wherein the shaft includes:
a shaft main body; and
an extension shaft having conductivity and fixed to an end portion on one axial side of the shaft main body;
the extension shaft includes a fixing portion fixed to the shaft main body;
the contacted portion is defined in the extension shaft; and
conductivity of the contacted portion is higher than conductivity of the fixing portion.

6. The motor assembly according to claim 5, wherein the shaft main body includes a hollow portion which opens at least at an end portion on one axial side;
the extension shaft includes a flange portion expanding radially outward from the end portion on the one axial side;
the fixing portion is on another axial side of the flange portion;
the contacted portion is on at least a portion of an outer surface of the flange portion; and
the fixing portion is in the hollow portion and is capable of being brought into contact to be fixed to an inner surface of the hollow portion.

7. The motor assembly according to claim 6, wherein the contacted portion is on an outer peripheral portion of the flange portion.

8. The motor assembly according to claim 6, wherein the contacted portion includes a conductive film made of a material having a higher conductivity than a material of the flange portion.

9. The motor assembly according to claim 6, wherein the flange portion is made of a material having higher conductivity than the fixing portion.

10. The motor assembly according to claim 6, wherein a coolant to cool the stator is stored in the housing;
the hollow portion penetrates in the axial direction;
the shaft main body includes an inlet through which the coolant flows at an end portion on the other axial side; and
the extension shaft has a tubular shape penetrating in the axial direction.

11. The motor assembly according to claim 10, wherein an inner diameter of the extension shaft is smaller than an inner diameter of the hollow portion.

12. The motor assembly according to claim 10, wherein the extension shaft further includes an annular inner flange portion expanding radially inward from an inner peripheral surface of the extension shaft.

13. A motor assembly comprising:
a motor including a rotor including a shaft rotatable about a rotation axis and a stator surrounding the rotor from radially outside;
a housing that accommodates the motor;
a bearing that is fixed to the housing and rotatably supports the shaft;
a resolver including a resolver rotor fixed to the shaft and a resolver stator fixed to the housing; and
a contact that has conductivity, is fixed to the housing, and is in contact with a contacted portion at an end portion on one axial side of the shaft; wherein
the housing includes an accommodation space in which the contacted portion of the shaft is accommodated;
the contact and the resolver are side by side in a direction along the rotation axis in the accommodation space; and
conductivity of the contacted portion is higher than conductivity of a bearing contact portion in contact with the bearing of the shaft.

14. A motor assembly comprising:
a motor including a rotor including a shaft rotatable about a rotation axis and a stator surrounding the rotor from radially outside;
a housing that accommodates the motor;
a bearing that is fixed to the housing and rotatably supports the shaft;
a resolver including a resolver rotor fixed to the shaft and a resolver stator fixed to the housing; and
a contact that has conductivity, is fixed to the housing, and is in contact with a contacted portion at an end portion on one axial side of the shaft; wherein the housing includes an accommodation space in which the contacted portion of the shaft is accommodated;

the contact and the resolver are side by side in a direction along the rotation axis in the accommodation space;

the shaft includes:
    a shaft main body; and
    an extension shaft having conductivity and fixed to an end portion on one axial side of the shaft main body;

the extension shaft includes a fixing portion fixed to the shaft main body;

the contacted portion is defined in the extension shaft; and conductivity of the contacted portion is higher than conductivity of the fixing portion.

15. The motor assembly according to claim 14, wherein the shaft main body includes a hollow portion which opens at least at an end portion on one axial side;

the extension shaft includes a flange portion expanding radially outward from the end portion on the one axial side;

the fixing portion is on another axial side of the flange portion;

the contacted portion is on at least a portion of an outer surface of the flange portion; and the fixing portion is in the hollow portion and is capable of being brought into contact to be fixed to an inner surface of the hollow portion.

16. The motor assembly according to claim 15, wherein the contacted portion is on an outer peripheral portion of the flange portion.

17. The motor assembly according to claim 15, wherein the contacted portion includes a conductive film made of a material having a higher conductivity than a material of the flange portion.

18. The motor assembly according to claim 15, wherein the flange portion is made of a material having higher conductivity than the fixing portion.

19. The motor assembly according to claim 15, wherein a coolant to cool the stator is stored in the housing;

the hollow portion penetrates in the axial direction;

the shaft main body includes an inlet through which the coolant flows at an end portion on the other axial side; and the extension shaft has a tubular shape penetrating in the axial direction.

20. The motor assembly according to claim 19, wherein an inner diameter of the extension shaft is smaller than an inner diameter of the hollow portion.

\* \* \* \* \*